2,727,143

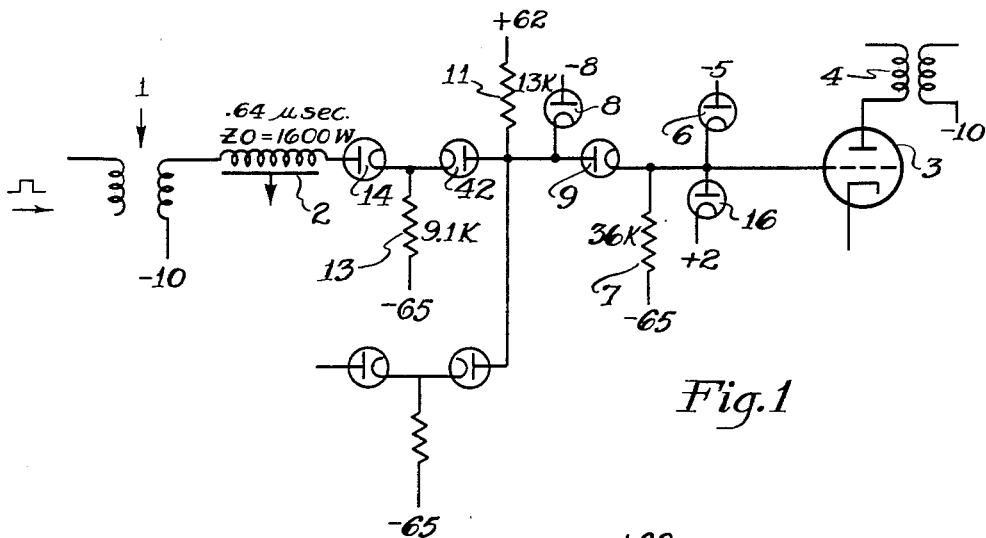
Fig.1
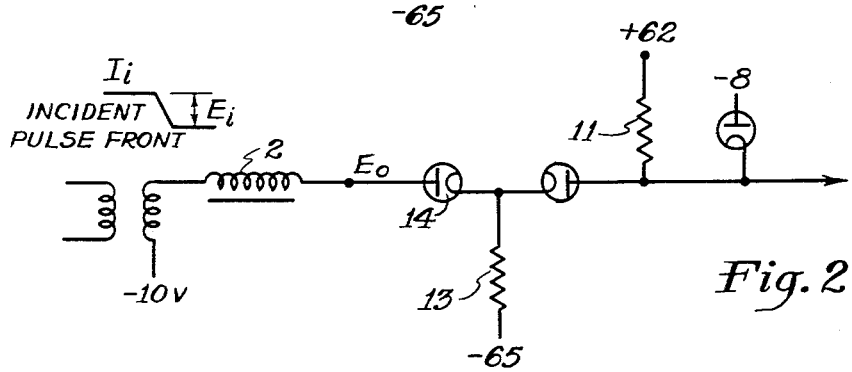
Fig.2
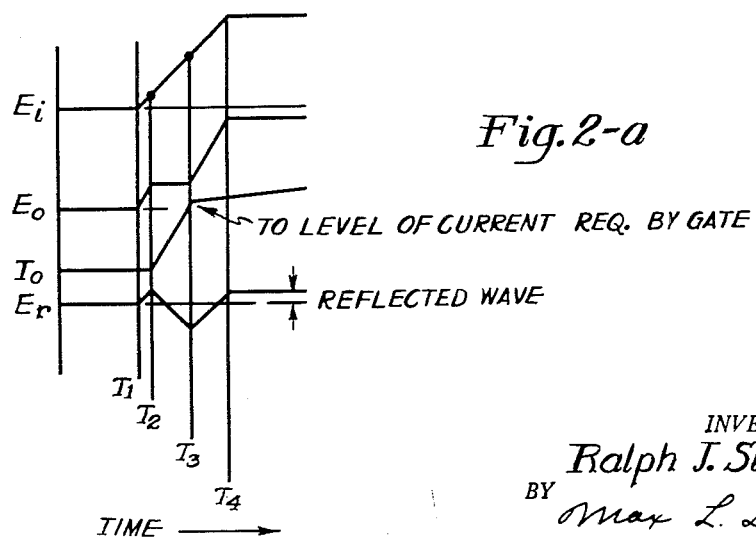
Fig.2-a
INVENTOR.
Ralph J. Slutz
BY Max L. Libman
ATTORNEY

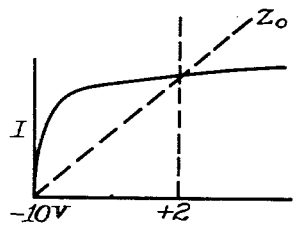
Fig. 4-a
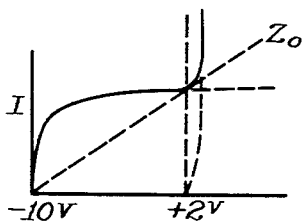
Fig. 4-b
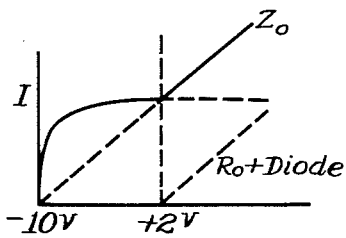
Fig. 4-c
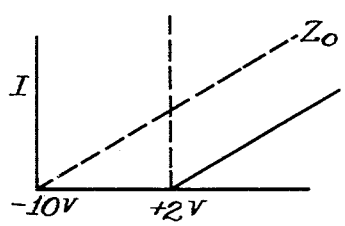
Fig. 4-d
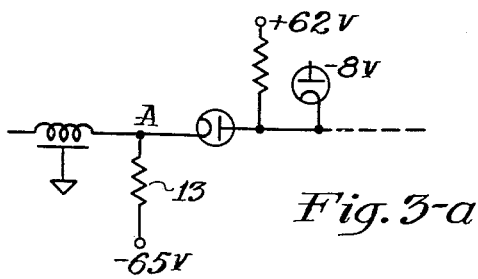
Fig. 3-a
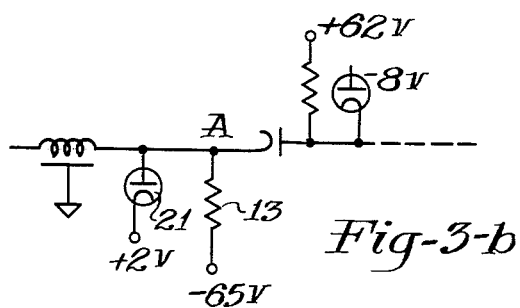
Fig. 3-b
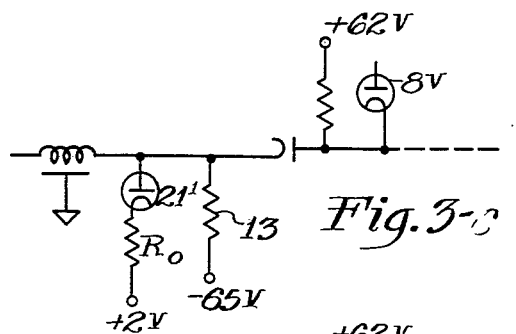
Fig. 3-c
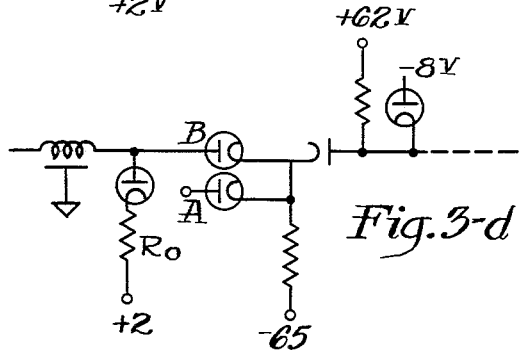
Fig. 3-d
INVENTOR.
Ralph J. Slutz
BY
Max L. Libman
ATTORNEY United States Patent Office
2,727,143
Patented Dec. 13, 1955

MEANS FOR MINIMIZING PULSE REFLECTIONS IN LINEAR DELAY LINES LOADED WITH A NONLINEAR LOAD

Ralph J. Slutz, Kensington, Md., assignor to the United States of America as represented by the Secretary of Commerce Application August 30, 1951, Serial No. 244,447

4 Claims. (Cl. 250—27)

(Granted under Title 35, U. S. Code (1952), sec. 266)

The invention described herein may be manufactured and used by or for the Government of the United States for governmental purposes without the payment to me of any royalty thereon in accordance with the provisions of the Act of March 3, 1883, as amended (45 Stat. 467; 35 U. S. C. 45).

This invention is concerned with minimizing pulse reflections in linear delay lines loaded with a nonlinear load. This is a serious problem in the operation of electronic digital computers of the type exemplified by the computer known as SEAC (Standards Eastern Automatic Computer) which is in operation at the National Bureau of Standards.

SEAC uses time-sequenced electronic pulses of approximately 50 percent duty factor, i. e., one-half microsecond in duration and spaced approximately one-half microsecond apart to represent digits and orders. Such pulses are electrically switched through various circuits for the purpose of performing desired computations at very high speed. Absolute accuracy in transmitting the pulses is, of course, essential to the proper operation of such a device. Synchronization of pulses is maintained by using a so-called "clock pulse" generator as a pulse source and referring all pulses in the system to said source. The pulses are often delayed somewhat in transition through a utilization circuit and in order to synchronize them with the next available clock pulse from the pulse generator, they may be deliberately delayed still further by the use of an artificial delay line of suitable electrical length so that the pulse will arrive at the desired point in the correct synchronization. In other cases delay lines are used to insure the synchronous arrival at a common point of pulses from different parts of SEAC which have fallen out of synchronization owing to the characteristics of the circuits through which they have passed. For these and other reasons, it is necessary to use electric delay lines in many places in the computer.

The actual electric switching operations in SEAC are performed by germanium diodes. These or any similar types of diodes are nonlinear devices; that is, their resistance is not constant but is a function of the amplitude and direction of the applied voltage. These diodes, together with their associated circuit elements, present a nonlinear load termination to the delay lines where these are used, and it has been found that such termination presents a serious reflection problem in some cases, as will be shown more fully below. The production of a reflected pulse travelling back along the delay line may adversely affect some subsequent pulses in the same circuit, since the reflected pulse may arrive at the pulse source in the correct phase to in effect cancel out a subsequent pulse and thus produce an error in the computation. This has in fact been found to occur in some parts of SEAC. It is a primary object of this invention to eliminate the possibility of errors occurring from this cause by simple readily available means.

More specifically, it is a further object to provide a circuit arrangement whereby voltage pulses of more than a certain magnitude will be attenuated or shorted to a much greater degree than pulses below that magnitude, so that excess pulse voltage above that needed for circuit utilization will be rendered ineffective to produce harmful reflections.

It is a specific object to provide a nonlinear shunt for the termination of a delay line, said shunt being returned to a low voltage source to prevent the production of reflected pulses of sufficiently high amplitude to cause trouble in the utilization circuits.

Another object is to provide a termination for a delay line transmitting pulses which presents to any excess voltage of such pulses an apparent impedance not greater than the characteristic impedance of the utilization line whereby reflected pulses will be either absent or else of opposite sign from the incident pulses.

The specific nature of the invention, as well as other objects and advantages thereof, will clearly appear from a description of a preferred embodiment, as shown in the accompanying drawings in which:

Figure 1 is a schematic circuit diagram of a basic gate circuit.

Figure 2 is a simplified diagram showing those components of the circuit of Figure 1 which are essential to a consideration of the invention.

Figure 2a shows graphically the changes with respect to time which occur in the incident and reflected voltage and current in the circuit of Figure 2.

Figure 3a, b, c, and d represent respectively the essential load component of the basic circuit of Figure 1 and various modifications applied thereto in accordance with my invention.

Figure 4a, b, c, and d represent graphically the impedance conditions in Figure 3a, b, c, and d, respectively.

Referring to Figure 1, an incoming pulse on the primary of transformer 1 is emitted from the secondary and suitably delayed by artificial delay line 2, which may be of any known type, and has the characteristics shown in the drawing, the particular value of impedance being selected, together with the impedance of the associated elements at the termination of the line, to match the characteristic impedance of the line as a whole, being, in the typical example selected, 1600 ohms. The incoming pulse (of approximately one-half microsecond duration and 50 percent duty factor in SEAC) is delayed approximately 0.64 microsecond in the example shown, this being required for the particular circuit shown in order to insure synchronization of the pulses from source 1 with other pulses from other sources.

The action of the circuit shown in Figure 1 will now be described briefly in order to show the manner of application of the invention to the SEAC, since this is a typical SEAC gate structure. Normally the grid of tube 3 is maintained at −5 volts and there is no signal output from the tube. To produce a signal it is desired that the grid be raised to +2 volts at a rapid rate (in practice, the rate of 100 volts per microsecond), kept close to +2 volts for somewhat less than one-half microsecond and dropped to −5 volts at the same rate of 100 volts per microsecond. This produces an amplified output from tube 3 which results in a pulse output from the secondary of transformer 4 similar to the original input pulse and with at least the same power as the original input pulse from transformer 1. To provide the necessary safety factor, the voltage input from transformer 1 is made considerably higher than +2 volts. However, the input to the grid of tube 3 is kept to a maximum of +2 volts by the action of the circuit which will now be described. The potential of the unpulsed grid is kept at −5 volts by "bumper" 6, which is a diode connected to a −5 volt source. Any tendency of the grid to drop below −5 results in current flow through diode 6 to keep the grid up to at least —5 volts. If the grid potential rises above —5 volts the diode has no effect, as its cathode is now higher in potential than its anode and no current can flow through it. Resistor 7 is connected to a —65 volt source and tends to pull the grid voltage down, but because of the above action the grid is maintained at —5 volts. Another diode, 8, is connected to a —8 volt source. Between diode 8 and resistor 7 is diode 9, which normally does not conduct because its anode is at a lower potential (—8 volts) than its cathode (—5 volts). Resistor 11 is connected to a +62 volt source. Current normally flows from resistor 11 and diode 8 to resistor 13 which is returned to —65 volts. As 13 is of lower resistance than 11, it tends to pull down the voltage at diode 8 to below —8 volts. The cathode of diode 42 is, however, kept at —8 volts by current supplied through diode 8. The source (secondary of transformer 1) is returned to —10 volts so that normally no current flows through diode 14, since its cathode is now raised above its anode. However, an incoming pulse raises the potential of the anode of diode 14 to above +2 volts, and the resulting conduction raises the cathode of diode 42 above its anode potential. Since current can no longer flow from resistor 11 through resistor 13, the anode of 42 rises toward +62 volts. Diode 8 ceases to conduct because its cathode rises above —8 volts and current now flows from resistor 11 through diode 9 and resistor 7. However, the rise is limited to +2 volts by diode 16 which is connected to a +2 volt source and begins to draw current to keep the grid at the +2 volt level whenever the grid voltage tends to rise above that point. Thus the grid voltage can fluctuate only between —5 volts and +2 volts regardless of the voltage of the incoming pulse. The above-described circuit is typical of the gate circuitry of SEAC and is per se no part of the present invention. Similar circuits working on the same principle are shown and described in the copending claims of Ralph J. Slutz, Serial No. 193,696, filed November 2, 1950, of William L. Martin et al., Serial No. 205,164, filed January 9, 1951 and of Robert D. Elbourn and Ralph J. Slutz, Serial No. 244,446, filed August 30, 1951, now Patent No. 2,712,065, issued June 28, 1955.

In order to explain the problem with whose solution this invention is concerned, the action of a part only of the circuit shown in Figure 1 will now be considered. Referring to Figures 2 and 2a, the characteristic impedance at the line will be considered in its relation to the incident pulse front, and may be expressed as $$Z_0 = \frac{E_i}{I_i} = \frac{E_r}{-I_r}$$

where $E_i$=incident pulse voltage
$I_i$=incident pulse current
$E_r$=reflected pulse voltage
$I_r$=reflected pulse current Furthermore, $$E_0 = E_i + E_r$$

where $E_0$=voltage at anode of diode 14.

When the pulse front arrives at the anode of diode 14 (Figure 2), this point at first behaves like an open circuit, since the diode prevents passage of current until its anode voltage reaches the unlatching level of the diode, i. e., the level at which the diode begins to conduct. Therefore, from time $T_1$ to $T_2$ (Figure 2a) $E_0$ rises at twice the rate of $E_i$ because of the addition of $E_r$, as in any open-ended line reflecting a wave front. After diode 14 begins to conduct, the line at this point behaves like a short circuit from time $T_2$ until the difference in the current in resistor 13 and resistor 11 is furnished entirely by the source, as at time $T_3$. This is so because the cathode of diode 14 is at —8 volts and the anode is considerably higher, and current will flow as in a short circuit until it reaches the level at which diode 8 ceases to conduct (at time $T_3$) from which point the increase in current corresponds only to the increase in $E_i$, i. e., $E_i/Z_0$, which is a much slower rate of increase than during the interval $T_2$ to $T_3$. During the time interval $T_2$ to $T_3$ the reflected voltage $E_r$ is dropping as $E_i$ is rising, since this is characteristic of short-circuited behavior. At time $T_3$, the anode again appears more or less like an open circuit, i. e., the impedance now presented to the pulse wave front is the relatively high impedance of resistors 11 and 13 in parallel. So far as the gate is concerned, soon after $T_3$ the necessary voltage level for its proper operation is reached. However, the pulse voltage continues to rise to its full value which is almost always higher than the minimum required for proper gate operation. This excess voltage is the major cause of reflection trouble, because now $E_0$ rises at twice the rate of $E_i$ as $E_r$ again builds up. The reflected positive voltage wave $E_r$ may, in returning to its point of origin through the line, arrive in the correct phase to cause trouble. The characteristics of the gate circuit are such that negative reflections cause little difficulty, except that greater power from the tube of the preceding stage will be required to overcome them in impressing subsequent pulses on the line, and there is usually sufficient power output available. Furthermore, examination of Figure 2a will show that the reflected negative voltage pulse $E_r$ tends to be of smaller magnitude than the positive pulse, since it can occur only during the time interval $T_2$ to $T_3$ and so does not have much time to build up to a high negative value, while the positive pulse may build up to a fairly high value if the excess pulse voltage is sufficiently high.

In a practical computer such as SEAC, the actual circuits tend to be rather complex, and the action is not always easy to follow. Perfect accuracy of pulse transmission is, of course, required; i. e., not a single pulse may be lost or improperly transmitted without entirely invalidating the computation, and with pulses at the rate of a million per second, in a run of some hours duration, which often occurs, the number of possibilities of error is tremendous, yet the circuitry must be such that even the most remotely improbable combination of random or transient effects is rendered innocuous. The above-described reflection effect does not in practice give difficulty often, nor is it possible in some of the circuit combinations used, but the circuit combinations themselves are electronically controlled by certain pulses acting as coded orders rather than as numbers, and the circuits are therefore changed and rearranged at the same high speeds as those at which the computations are performed. Under these circumstances it was found that errors can occasionally occur, and the provision of a way to successfully correct the difficulty was attained by the means described below.

According to the present invention the possibility of delayed reflections through lines of sufficient electrical length to produce harmful phase relationships is minimized, or in practice totally eliminated, by providing an additional terminal load of such character that it does not appreciably affect the pulse action in the useful voltage range of the pulse, but does provide, in all higher voltage ranges, an apparent terminal impedance at least equal to, or below, the characteristic impedance of the line. At the characteristic impedance there is, of course, no reflection, and at a discontinuity representing a lower impedance than the characteristic impedance, the reflected voltage pulse is opposite in sign from the incident pulse and therefore does no harm, as above pointed.

This new termination is accomplished by connecting to the load end of the line, as shown in Figure 3b, a diode 21 returned to a voltage source of a value in the order of the maximum grid voltage—in this case +2 volts. In practice this return voltage may be slightly higher, for example +4 volts, to provide a safety factor of voltage to take care of voltage drops further along the line toward the grid. The curves shown in Figure 4 show the effective impedance changes which occur in the corresponding circuits of Figure 3 as the voltage increases. The dotted line $Z_0$ represents the characteristic impedance of the line. Because of the nonlinear loading of the line by the gate element described, the impedance in the range −10 volts to +2 volts varies in nonlinear fashion as shown. The curve shown in Figure 4a represents the action in the circuit of Figures 1 and 2. At voltages above the maximum grid voltage of +2 volts the effective impedance is higher than the characteristic impedance, and therefore an undesirable positive reflected voltage occurs. Figure 4b shows impedance conditions for the circuit of Figure 3b. At the +2-volt grid level the load impedance drops suddenly because of the shunting action of diode 21 at voltages above this level, and thereafter is at all times less than the characteristic impedance of the line, so that the undesirable positive pulse reflection does not occur.

An alternative arrangement is shown in Figure 3c, which is very similar to Figure 3b except that a resistance $R_0$ is in series with the diode 21′. This resistor is preferably of such value that the parallel combination of it and the resistor 13 to the −65-volt supply is approximately equal to the characteristic impedance of the line. The corresponding impedance curve is shown in Figure 4c. This arrangement nicely absorbs the excess voltage from a single source, but is not so effective in the case of a gate having two inputs as shown in Figure 3d, if input A produces pulses of considerably greater amplitude than input B, in which case a large reflection will be sent back toward source B if two pulses from both sources arrive simultaneously, with the undesirable effect previously noted. The apparent impedance to a pulse coming in from a source B under these conditions is represented in Figure 4d. It will be seen that the composite impedance characteristic beyond +2 volts is higher than the characteristic impedance $Z_0$ of the line. The arrangement of Figure 3c cannot therefore be used under these conditions, but should be used only where there is a single gate of the type shown in Figure 3c. For the dual input of Figure 3d the arrangement of Figure 3b should be used, i. e., a diode returned to +2 volts without the resistor $R_0$.

By the provision of an additional nonlinear load of the type described, it has proved possible in SEAC to entirely eliminate harmful reflection effects. SEAC, in which this invention is employed, has been able to operate on lengthy problems, involving many hours of continuous running, at a pulse rate of a megacycle, without a single erorr in pulse transmission. The present invention has been found to be a complete solution to the troublesome problem of harmful reflections despite the complex action of the normal nonlinear load coupled to a delay line.

It will be apparent that the embodiments shown are only exemplary and that various modifications can be made within the scope of my invention as defined in the appended claims.

I claim:

1. In a pulse utilization system comprising a delay line loaded with nonlinear pulse utilization means adapted for operation at a definite voltage level, means for preventing harmful reflections which comprises a shunt connected across the load end of said delay line between said delay line and said load, said shunt comprising a nonlinear impedance element whose impedance changes abruptly at approximately said definite voltage level said shunt being returned to a voltage source of a value substantially the value of said definite voltage level.

2. In an electronic system for transmitting and utilizing discrete electric pulses of very short duration at a very high repetition rate which comprises means for producing such pulses, a delay line for retarding pulses by a predetermined amount, a nonlinear pulse utilization circuit connected to said delay line, said circuit having means presenting an impedance not higher than the characteristic impedance of said line to voltages of a certain utilized value and a much higher impedance to voltages in excess of said value whereby harmful reflections may occur because of said excess voltage value, the improvement which comprises an additional nonlinear load for said system connected to a voltage source of said utilized value and so oriented as to present a high impedance to said pulses at voltages below said utilization value but a low impedance to said pulses at voltages above said utilization value, whereby said excess voltage is shunted and prevented from producing said harmful reflections.

3. The invention as recited in claim 2 and a resistance in series with said additional nonlinear load, said resistance being of such value that the total impedance presented to said pulses at voltages above said utilization value is in the region of the characteristic impedance of the line.

4. In a gating circuit for an electronic digital computer, said gating circuit including a pulse transformer having a primary and a secondary winding returned to a low reference voltage, a delay line connected to the high side of said secondary winding for retarding pulses produced in said secondary by a predetermined amount, a nonlinear pulse combining and amplifying circuit connected to said delay line, said last circuit including resistors and diode elements oriented and arranged to effectively transmit said pulses within a predetermined voltage range, said last circuit thereby presenting an impedance not higher than the characteristic impedance of said line to voltage pulses within said predetermined voltage range, and a higher impedance to voltages in excess of said value whereby such voltages may produce harmful reflections, means for producing in said secondary, pulses of higher voltage than the upper level of said predetermined voltage range usable by said pulse combining and amplifying circuit, and means for preventing harmful reflections due to such excess voltage, said last means comprising an additional nonlinear element at the utilization end of said delay line, said nonlinear element connected to a voltage source substantially at the upper level of said predetermined voltage range, and being so oriented as to present a high impedance to said pulses at voltages below said level but a low impedance to said pulses at voltages above said utilization value whereby said excess voltage is shunted and prevented from producing said harmful reflections.

References Cited in the file of this patent

UNITED STATES PATENTS

| | | |
|---|---|---|
| 2,085,418 | Crosby | June 29, 1937 |
| 2,104,336 | Tuttle | Jan. 4, 1938 |
| 2,262,468 | Percival | Nov. 11, 1941 |
| 2,438,367 | Keister | Mar. 23, 1948 |
| 2,525,454 | Lord | Oct. 10, 1950 |
| 2,557,122 | Leiphart | June 19, 1951 |